United States Patent
Noordam, Jr.

[15] 3,666,669
[45] May 30, 1972

[54] FISHERMAN'S SOAP

[72] Inventor: John Paul Noordam, Jr., 6239 South 40th St., Omaha, Nebr.

[22] Filed: May 13, 1970

[21] Appl. No.: 37,053

[52] U.S. Cl............................252/132, 43/4.5, 43/42, 43/42.06, 99/3, 252/108, 424/84
[51] Int. Cl................A01k 85/00, C11d 9/38, C11d 9/44
[58] Field of Search............252/132; 99/3; 43/42, 42.06, 43/4.5; 424/84

[56] References Cited

UNITED STATES PATENTS

| | | |
|---|---|---|
| 3,421,899 | 1/1969 | Humphreys....................99/3 |
| 2,874,048 | 2/1959 | Walldov.........................99/3 |
| 2,449,322 | 9/1948 | Richardson....................99/3 |
| 973,549 | 10/1910 | O'Bryant......................99/3 |

OTHER PUBLICATIONS

" American Soap Maker's Guide" by I. V. S. Stanislaus et al., Published by Henry Carey Baird and Co., New York, 1928, Pages 544, 550, 551, 600 and 603. TP 990. S7.
" Basic Fishing" by Harlan Major, Published by Funk and Wagnalls Co., 1947, page 14.
" Fishing Made Easy" by Arthur L. Cone, Jr., Published by The MacMillan Co., New York, 1968, Pages 5 and 6.

Primary Examiner—John D. Welsh
Assistant Examiner—Dennis L. Albrecht
Attorney—Zarley, McKee & Thomte

[57] ABSTRACT

A soap with which fishermen can wash bait and with which a fisherman can wash his hands for preventing excessive human scent from remaining on the bait and for providing the bait with sufficient anise oil and cinnamon to substantially help in attracting fish to the bait.

2 Claims, No Drawings

FISHERMAN'S SOAP

FIELD OF THE INVENTION

This invention is in the general field of devices for assisting in the catching of fish, but more specifically in the field of devices for catching fish by means commonly used by the majority of recreational fishermen.

DESCRIPTION OF THE PRIOR ART

In my opinion, the prior art has given insufficient attention to the problem of human scent on bait, although it is known that fish are repelled by human scent.

In the prior art cinnamon and anise oil have been added to fish lures such as dough balls.

But despite this, no convenient and practical way has been made available to the public to my knowledge.

As a consequence, almost all fish lures are put into the water with human scent on them. And, also, almost all fish lures are put in the water without any advantage being added to the sport by the existence of this prior art knowledge.

Fishing plugs, fly rod flies, and all types of live and imitation bait are for the most part used in a fashion such that the fish are to a considerable degree either repelled or warned away.

In the complex noisy, hectic modern life, more effective recreation is vital to sanity. Our mental institutions are filling up with people who did not find recreational outlets sufficiently attractive to balance the problems of their work life.

Our parks and recreation experts know how to stock streams and lakes with fish. It is important, however, that our recreation seekers be able to come home from fishing with a satisfying catch rather than either a paltry few or an empty-handed experience.

It is important that it not require a long study of the science of fishing to be able to catch merely a satisfying few fish. These delightful experiences should be made available to both amateurs and children.

SUMMARY OF THE INVENTION

A soap with which fishermen can wash bait and with which a fisherman can wash his hands for preventing excessive human scent from remaining on the bait and for providing the bait with sufficient anise oil and cinnamon to substantially help in attracting fish to the bait.

The amount of anise oil in the soap being in the ratio of approximately two to two and one-half teaspoons of anise oil per each 6.72 pounds of cured soap.

The amount of cinnamon in the soap being in the ratio of approximately one teaspoon of cinnamon to each 6.72 pounds of cured soap.

DESCRIPTION OF THE PREFERRED EMBODIMENT

The fisherman's soap of this invention is made preferably in bar form as a finished product, although it is equally effective as a liquid soap, as some may prefer.

To make the liquid fisherman's soap of this invention sufficient cinnamon and anise oil are added to liquid soap so that when bait is washed with the soap sufficient human scent is removed from the bait and sufficient anise oil and cinnamon are added to the bait to help attract fish, the amount of anise oil in the soap being in the ratio of approximately 2 to 2½ teaspoons of anise oil per each 9 pounds, 12 ounces of liquid soap solution, and the amount of cinnamon being approximately 1 teaspoon to each 6.72 pounds of liquid soap.

To make the fisherman's soap of this invention in bar for sufficient cinnamon and anise oil are added to liquid soap base whereby when the soap is cured it can be used in bar form so that when bait is washed with the soap sufficient human scent is removed from the bait and sufficient anise oil and cinnamon are added to the bait to help attract fish, the amount of anise oil in the soap being in the ratio of approximately 2 to 2½ teaspoons of anise oil per each 6.72 pounds of cured soap, and in which said soap has cinnamon in it in the ratio of approximately 1 teaspoon of cinnamon to each 6.72 pounds of cured soap.

I claim:

1. A fisherman's soap composition consisting essentially of soap, anise oil and cinnamon, wherein said ingredients are present in the relative proportions of 6.72 to 9.75 pounds of soap, 2 to 2.5 teaspoons of anise oil and 1.0 teaspoon of cinnamon.

2. The method of treating fish bait and lures comprising the following steps taking a soap composition consisting essential of soap, anise oil and cinnamon in the relative proportions of approximately 6.75 to 9.75 pounds of soap to 2.0 to 2.5 teaspoons of anise oil to 1.0 teaspoon of cinnamon,
   washing the fisherman's hands with the soap composition to remove the scent therefrom and washing the bait or lure with the soap composition whereby scent is removed from the bait or lure and whereby aromatic attractants are added to the bait or lure.

* * * * *